E. R. BAILEY.
NUT LOCK.
APPLICATION FILED JUNE 12, 1908.
905,780.
Patented Dec. 1, 1908.
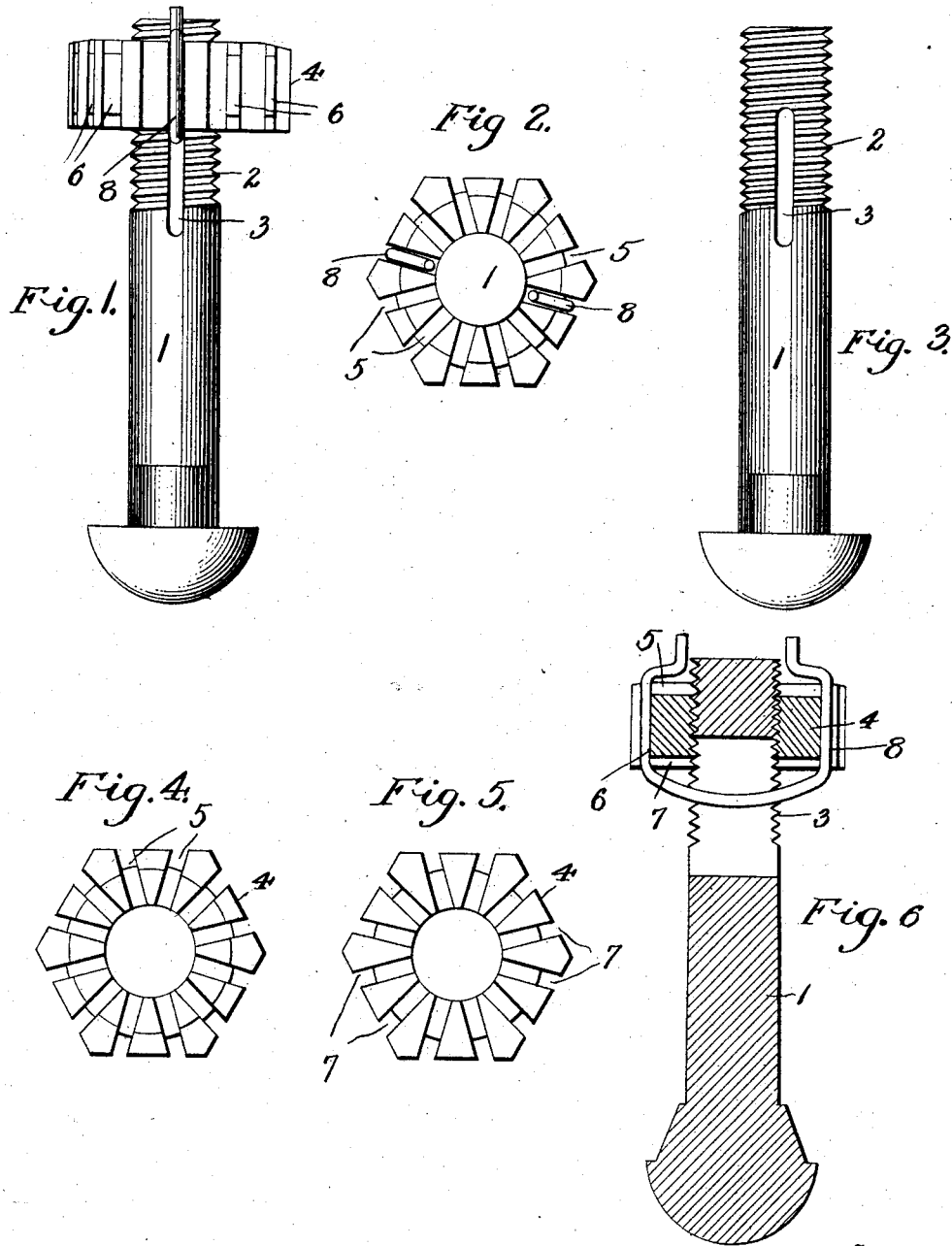

UNITED STATES PATENT OFFICE.

ETMA R. BAILEY, OF FORDOCHE, LOUISIANA.

NUT-LOCK.

No. 905,780.  Specification of Letters Patent.  Patented Dec. 1, 1908.

Application filed June 12, 1908. Serial No. 438,222.

*To all whom it may concern:*

Be it known that I, ETMA R. BAILEY, a citizen of the United States, residing at Fordoche, in the parish of Pointe Coupee and State of Louisiana, have invented certain new and useful Improvements in Nut-Locks, of which the following is a specification.

The object of my invention is to produce a nut lock that is simple, yet effective, and with this and minor objects in view, my invention consists of the parts and combination of parts as will be more fully hereinafter pointed out.

In the drawings, Figure 1 is a side elevation of a bolt and nut, embodying my invention; Fig. 2 is an end elevation of the same; Fig. 3 is a side elevation of the bolt; Fig. 4 is a top plan view of the nut; Fig. 5 is a bottom plan view of the nut; and Fig. 6 is a central longitudinal section of the bolt and nut.

1 represents the bolt which may be of any approved construction, having the usual screw threaded portion 2.

3 is an elongated slot formed transversely of the bolt. This slot extends from a point equal to the thickness of the nut, near the screw threaded end of the bolt to a point beyond the screw thread on the smooth portion of the bolt.

From the drawing, it will be seen that by my invention the end of the bolt is solid and that notwithstanding the elongated slot, the bolt retains all of its inherent strength. That is to say, the bolt is not weakened nor are the screw threads by reason of said slot.

4 is a nut of usual construction, except that it is provided with intersecting grooves 5, 6 and 7 on the top, sides and bottom, respectively. The grooves 5 and 7 converge toward the center of the nut.

8 is a lock consisting of a piece of wire loosely mounted in the elongated slot of the bolt and free to move throughout the entire length of said slot when not engaged with the nut.

After the bolt has been placed in position, the nut is screwed thereon and the lock wire 8 inserted in the elongated slot. As soon as the nut is screwed as tightly as is desired, the wire lock 8 is seated in diametrically opposite grooves on the bottom of the nut, the wire being then pressed in diametrically opposite grooves in the sides of the nut, the ends of the wire being pressed by the hand of the operator or any suitable tool into diametrically opposite grooves in the top of the nut and thence against the sides of the bolt, as shown in the drawing. The upwardly extending ends of the wire alongside of the bolt provide for a ready adjustment of the lock, and in case it is desired to remove the nut, the said projecting ends may be readily spread apart, thus disengaging the wire from the top, side and bottom grooves of the nut, whereupon the nut is free to be removed.

By providing the bolt with an elongated slot, I am enabled to lock the nut at any distance from the end of the bolt that the work may require, inasmuch as the wire is free to move throughout the length of the elongated slot. Another advantage is that I am enabled to cut the wire lock in uniform lengths.

The bolt is not necessarily weakened by the elongated slot, in view of the fact that said slot terminates some distance from the end of the bolt.

Having thus described my invention, what I claim as new therein and desire to secure by Letters Patent is:—

1. In a nut lock, the combination with a bolt having an elongated slot terminating some distance from the end thereof, of a nut having grooves in its top, bottom and side faces, and a wire loosely positioned in said elongated slot and free to move throughout the entire length of said slot and adapted to be seated by means of bending in the bottom, top and side grooves of the nut.

2. In a nut lock, the combination with a bolt having an elongated slot terminating some distance from the end thereof, of a nut having grooves in the top, bottom and side faces thereof, the grooves in the top and bottom faces converging toward the center of the nut, and a wire loosely positioned in said elongated slot and free to move throughout the length of the slot and adapted to be seated in the grooves in the bottom, top and side faces of the nut.

In testimony whereof I affix my signature in presence of two witnesses.

ETMA R. BAILEY.

Witnesses:
L. B. BAILEY,
FERNS JOHNSON.